(12) United States Patent
Kim (10) Patent No.: US 8,977,465 B2
(45) Date of Patent: Mar. 10, 2015

(54) VEHICLE BRAKING SYSTEM AND CONTROL METHOD THEREOF

(75) Inventor: Sang Mook Kim, Gyeonggi-do (KR)

(73) Assignee: Mando Corporation, Gyeonggi-Do (KR)

( * ) Notice: Subject to any disclaimer, the term of this patent is extended or adjusted under 35 U.S.C. 154(b) by 239 days.

(21) Appl. No.: 13/450,175

(22) Filed: Apr. 18, 2012

(65) Prior Publication Data

US 2012/0265419 A1     Oct. 18, 2012

(30) Foreign Application Priority Data

Apr. 18, 2011    (KR) ........................ 10-2011-0035481

(51) Int. Cl.
*B60L 7/18*     (2006.01)
*B60L 3/10*     (2006.01)
*B60L 7/26*     (2006.01)
*B60L 7/24*     (2006.01)

(52) U.S. Cl.
CPC . *B60L 7/18* (2013.01); *B60L 3/104* (2013.01); *B60L 3/108* (2013.01); *B60L 7/26* (2013.01); *B60L 3/102* (2013.01); *B60L 7/24* (2013.01); *B60L 2220/44* (2013.01); *B60L 2240/12* (2013.01); *B60L 2240/461* (2013.01); *B60L 2240/465* (2013.01); *B60L 2250/26* (2013.01); *B60T 2270/602* (2013.01); *B60T 2270/604* (2013.01)
USPC ............................. 701/71; 303/152; 303/154

(58) Field of Classification Search
CPC ..................................... B60L 7/26; B60L 7/18
USPC ................... 701/71, 70, 74, 82; 303/152, 154
See application file for complete search history.

(56) References Cited

U.S. PATENT DOCUMENTS

| | | | |
|---|---|---|---|
| 7,104,617 B2 * | 9/2006 | Brown ......................... | 303/152 |
| 2002/0180266 A1 * | 12/2002 | Hara et al. .................... | 303/152 |
| 2010/0094511 A1 * | 4/2010 | Krueger et al. ................. | 701/48 |
| 2010/0113215 A1 * | 5/2010 | Jager et al. ...................... | 477/29 |

FOREIGN PATENT DOCUMENTS

| | | |
|---|---|---|
| DE | 102008017480 A1 | 10/2008 |
| JP | 2009-278840 | 11/2009 |

(Continued)

OTHER PUBLICATIONS

IEEE PSRC, WG I 19 Members, Definition of the term "Redundancy", Protection, Automation & Control World (PAC World), Mar. 2010.*

(Continued)

*Primary Examiner* — John Q Nguyen
*Assistant Examiner* — Nadeem Odeh
(74) *Attorney, Agent, or Firm* — McDermott Will & Emery LLP (57) ABSTRACT

Disclosed herein is a vehicle braking system and control method. The vehicle braking control method includes detecting velocities of respective wheels provided at a vehicle, calculating a vehicle velocity based on the velocities of the respective wheels, calculating slip amounts of the respective wheels by comparing the vehicle velocity and the velocities of the respective wheels, calculating change rates of the slip amounts of the respective wheels, obtaining regenerative braking force corresponding to one of the slip amounts and the slip change rates of the respective wheels, and controlling regenerative braking using the obtained regenerative braking force.

8 Claims, 4 Drawing Sheets

(56) References Cited

FOREIGN PATENT DOCUMENTS

| | | |
|---|---|---|
| JP | 2010-179742 | 8/2010 |
| KR | 2002-0091799 A | 12/2002 |
| KR | 10-2008-0044944 | 5/2008 |

OTHER PUBLICATIONS

Office Action issued in German Application No. 10 2012 007 938.9 dated Aug. 29, 2013.

Korean Office Action issued in Korean Patent Application No. 10-2011-0035481 mailed Oct. 4, 2012.

* cited by examiner

VEHICLE BRAKING SYSTEM AND CONTROL METHOD THEREOF

CROSS-REFERENCE TO RELATED APPLICATION

This application claims the benefit of Korean Patent Application No. 2011-0035481, filed on Apr. 18, 2011 in the Korean Intellectual Property Office, the disclosure of which is incorporated herein by reference.

BACKGROUND

1. Field

Embodiments of the present invention relate to a vehicle braking system and a control method thereof which secure braking stability of a vehicle.

2. Description of the Related Art

Recently, hybrid vehicles and electric vehicles are provided with an internal combustion engine and a motor which is driven by electric energy of a high voltage battery, and are thus new-generation environmental vehicles driven by such a motor.

The high voltage battery to supply driving power to the motor is mounted in the hybrid vehicles and electric vehicles. Such a high voltage battery supplies electric energy to the motor during driving of the motor and charges electric energy generated by the motor during regenerative braking or driving of the engine.

In more detail, the motor performs the function of an electric generator if a driver gives a decelerating command or a braking command, and thus generates electric energy. At this time, the battery performs charging. While the motor acts as the generator in this manner, braking torque is generated on wheels, and such braking torque is referred to as regenerative braking force.

In order to secure braking force required by a driver during braking, the hybrid vehicles and electric vehicles use regenerative braking force using the motor of the vehicle and hydraulic braking force using brake hydraulic pressure. Here, the hydraulic braking force is a value obtained by subtracting regenerative braking force generated by the motor from required braking force.

Further, the hybrid vehicles and electric vehicles stop regenerative braking and controls hydraulic braking force using brake hydraulic pressure, when a safety function, such as an ABS or an ESC, is operated during regenerative braking, thereby securing braking stability of the vehicle.

Here, the hybrid vehicles and electric vehicles pass through a conversion section between regenerative braking and hydraulic braking, and may obstruct braking stability of the vehicle due to maintenance or increase of slippage of drive wheels by remaining regenerative braking force in the switch section in which regenerative braking is not stopped.

Further, in the hybrid vehicles and electric vehicles, rapid change of brake hydraulic pressure due to operation of the safety function, such as the ABS or the ESC, in the switch section between regenerative braking and hydraulic braking provides undesirable fluctuation to the motor which is not stopped according to the remaining amount of regenerative braking force, and may thus obstruct braking stability of the vehicle.

SUMMARY

Therefore, it is an aspect of the present invention to provide a vehicle braking system and control method which restricts regenerative braking force using at least one of slip amounts and slip change rates of respective wheels and then operates a safety function, such as the ABS or the ESC.

It is another aspect of the present invention to provide a vehicle braking system and control method which minimizes a switch section between regenerative braking and hydraulic braking using at least one slip amounts and slip change rates of respective wheels in an operation area of a safety function, such as the ABS or the ESC.

Additional aspects of the invention will be set forth in part in the description which follows and, in part, will be obvious from the description, or may be learned by practice of the invention.

In accordance with one aspect of the present invention, a vehicle braking system includes a wheel velocity detection unit detecting velocities of respective wheels provided at a vehicle, and a controller calculating a vehicle velocity based on the velocities of the respective wheels of the vehicle, calculating slip amounts of the respective wheels by comparing the vehicle velocity and the velocities of the respective wheels, selecting one slip amount from among the slip amounts of the respective wheels, comparing the selected slip amount with a reference slip amount, obtaining regenerative braking force corresponding to an exceeding slip amount if the selected slip amount exceeds the reference slip amount, and controlling regenerative braking based on the obtained regenerative braking force.

The controller may stop the regenerative braking and control hydraulic braking when a safety function is performed during the control of the regenerative braking.

Regenerative braking forces according to exceeding slip amounts may be stored in advance in the controller.

The controller may calculate change rates of the slip amounts of the respective wheels, select one slip change rate from among the slip change rates of the respective wheels, compare the selected slip change rate with a reference slip change rate, obtain regenerative braking force corresponding to an exceeding slip change rate if the selected slip change rate exceeds the reference slip change rate, and control regenerative braking using the obtained regenerative braking force.

Regenerative braking forces according to exceeding slip change rates may be stored in advance in the controller The controller may compare the regenerative braking force corresponding to the exceeding slip amount and the regenerative braking force corresponding to the exceeding slip change rate if the selected slip amount exceeds the reference slip amount and the selected slip change rate exceeds the reference slip change rate, simultaneously, and control regenerative braking using the smaller regenerative braking force of the two regenerative braking forces.

In accordance with another aspect of the present invention, a vehicle braking control method includes detecting velocities of respective wheels provided at a vehicle, calculating a vehicle velocity based on the velocities of the respective wheels, calculating slip amounts of the respective wheels by comparing the vehicle velocity and the velocities of the respective wheels, selecting one slip amount from among the slip amounts of the respective wheels, comparing the selected slip amount with a reference slip amount, obtaining regenerative braking force corresponding to an exceeding slip amount based on regenerative braking forces according to exceeding slip amounts stored in advance, if the selected slip amount exceeds the reference slip amount, and controlling regenerative braking using the obtained regenerative braking force.

The vehicle braking control method may further include controlling regenerative braking using target regenerative braking force corresponding to a driver's braking requirement if the selected slip amount is less than the reference slip amount.

The vehicle braking control method may further include stopping the regenerative braking and controlling hydraulic braking when a safety function of the vehicle is performed.

The safety function may be one of an ABS and an ESC.

The selection of one slip amount from among the slip amounts of the respective wheels may include selecting the maximum slip amount.

In accordance with another aspect of the present invention, a vehicle braking control method includes detecting velocities of respective wheels provided at a vehicle, calculating a vehicle velocity based on the velocities of the respective wheels, calculating slip amounts of the respective wheels by comparing the vehicle velocity and the velocities of the respective wheels, calculating change rates of the slip amounts of the respective wheels, selecting one slip change rate from among the slip change rates of the respective wheels and comparing the selected slip change rate with a reference slip change rate, obtaining regenerative braking force corresponding to an exceeding slip change rate based on regenerative braking forces according to exceeding slip change rates stored in advance, if the selected slip change rate exceeds the reference slip change rate, and controlling regenerative braking using the obtained regenerative braking force.

The selection of one slip change rate from among the slip change rates of the respective wheels may include selecting the maximum slip change rate.

In accordance with yet another aspect of the present invention, a vehicle braking control method includes detecting velocities of respective wheels provided at a vehicle, calculating a vehicle velocity based on the velocities of the respective wheels, calculating slip amounts of the respective wheels by comparing the vehicle velocity and the velocities of the respective wheels, calculating change rates of the slip amounts of the respective wheels, obtaining regenerative braking force corresponding to one of the slip amounts and the slip change rates of the respective wheels, and controlling regenerative braking using the obtained regenerative braking force.

The obtainment of the regenerative braking force may include selecting one slip amount from among the slip amounts of the respective wheels and comparing the selected slip amount with a reference slip amount, calculating change rates of the slip amounts of the respective wheels, selecting one slip change rate from among the slip change rates of the respective wheels and comparing the selected slip change rate with a reference slip change rate, obtaining regenerative braking force corresponding to an exceeding slip amount and regenerative braking force corresponding to an exceeding slip change rate if the selected slip amount exceeds the reference slip amount and the selected slip change rate exceeds the reference slip change rate, simultaneously, and obtaining the smaller regenerative braking force of the two regenerative braking forces by comparing the two obtained regenerative braking forces.

The obtainment of the regenerative braking force may further include obtaining regenerative braking force corresponding to the exceeding slip amount if the selected slip amount exceeds the reference slip amount and the selected slip change rate is less than the reference slip change rate, obtaining regenerative braking force corresponding to the exceeding slip change rate if the selected slip amount is less than the reference slip amount and the selected slip change rate exceeds the reference slip change rate, and obtaining target regenerative braking force corresponding to a driver's braking requirement if the selected slip amount is less than the reference slip amount and the selected slip change rate is less than the reference slip change rate, simultaneously.

The selection of one slip amount from among the slip amounts of the respective wheels may include selecting the maximum slip amount, and the selection of one slip change rate from among the slip change rates of the respective wheels may include selecting the maximum slip change rate.

The obtainment of the regenerative braking force may include storing regenerative braking forces according to exceeding slip amounts and regenerative braking forces according to exceeding slip change rates in advance, obtaining regenerative braking force corresponding to the exceeding slip amount from among the regenerative braking forces according to exceeding slip amounts, and obtaining regenerative braking force corresponding to the exceeding slip change rate from among the regenerative braking forces according to exceeding slip change rates.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout.

Figure 1:
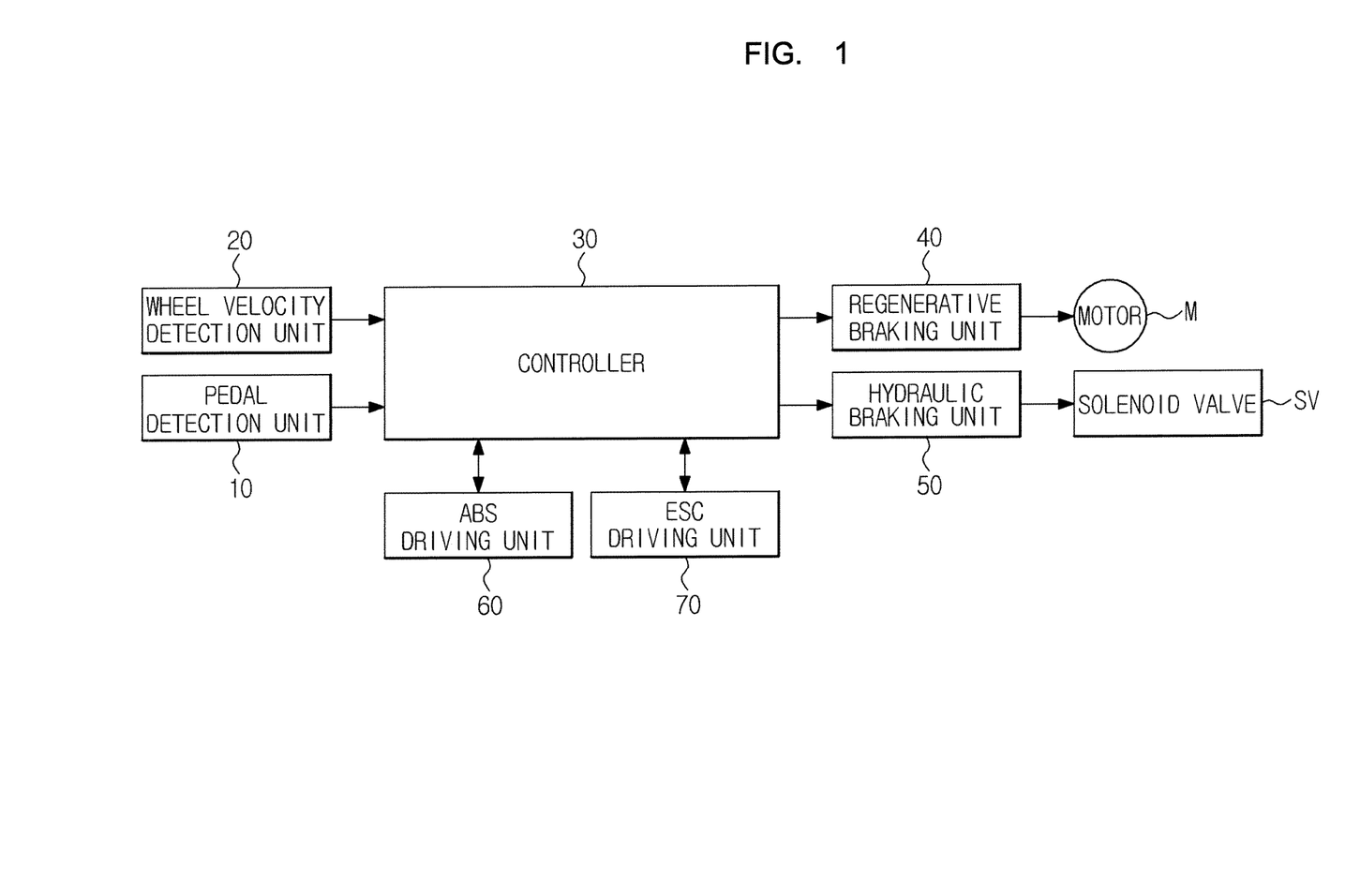
FIG. 1 is a block diagram of a vehicle braking system in accordance with one embodiment of the present invention.

FIG. 1 is a block diagram of a vehicle braking system in accordance with one embodiment. The vehicle braking system includes a wheel velocity detection unit 20, a pedal detection unit 10, a controller 30, a regenerative braking unit 40, a hydraulic braking unit 50, an ABS driving unit 60, an ESC driving unit 70, motors M and solenoid valves SV.

The wheel velocity detection unit 20 includes an FL wheel velocity sensor installed at a front left (FL) wheel of a vehicle to detect the velocity of the front left (FL) wheel, an FR wheel velocity sensor installed at a front right (FR) wheel of the vehicle to detect the velocity of the front right (FR) wheel, an RL wheel velocity sensor installed at a rear left (RL) wheel of the vehicle to detect the velocity of the right left (RL) wheel, and an RR wheel velocity sensor installed at a rear right (RR) wheel of the vehicle to detect the velocity of the rear right (RR) wheel. The respective wheel velocity sensors of the wheel velocity detection unit 20 transmit the detected velocities of the wheels to the controller 30.

The pedal detection unit 10 detects a pedal stroke of a brake pedal pressed by a driver during braking, and transmits the pedal stroke to the controller 30.

Here, the pedal detection unit 10 may employ a travel sensor which is installed on the brake pedal and judges a driver's braking intention and required braking force.

The controller 30 judges required braking force according to the driver's intention based on a detected signal transmitted from the pedal detection unit 10, and controls the regenerative braking unit 40 and the hydraulic braking unit 50 so as to generate target regenerative braking force and hydraulic braking force corresponding to the required braking force.

The controller 30 calculates target regenerative braking force which will be generated by the motors M while performing regenerative braking during braking, and judges hydraulic braking force additionally necessary to brake the wheels of the vehicle by comparing the target regenerative braking force with the required braking force.

Thereby, the controller 30 increases or decreases the pressure of a brake fluid by controlling the brake fluid supplied from a booster to a master cylinder and controlling the solenoid valves SV of the hydraulic braking unit 50, and then supplies the brake fluid to respective wheel cylinders. Thus, hydraulic braking force is applied to the wheel cylinders of the respective wheels, thereby braking the vehicle.

The controller 30 calculates a vehicle velocity by comparing the velocities of the front left and right wheels and compares the velocities of the rear left and right wheels based on the respective wheel velocities detected by the wheel velocity detection unit 20, calculates slip amounts of the respective wheels by comparing the calculated vehicle velocity and the respective wheel velocities, calculates change rates of the slip amounts of the respective wheels, i.e., slip change rates, and restricts regenerative braking force using at least one of the maximum slip amount of the slip amounts of the respective wheels and the maximum slip change rate of the slip change rates of the respective wheels.

The controller 30 judges whether or not the ABS driving unit 60 or the ESC driving unit 70 is driven during regenerative braking, and stops regenerative braking and controls hydraulic braking if the ABS driving unit 60 or the ESC driving unit 70 is driven.

Here, after yaw rates of the front left and right wheels are calculated based on the velocities of the front left and right wheels and a distance between the front left and right wheels and yaw rates of the rear left and right wheels are calculated based on the velocities of the rear left and right wheels and a distance between the rear left and right wheels, the vehicle velocity may be estimated based on the yaw rates of the front left and right wheels and the yaw rates of the rear left and right wheels.

The vehicle braking system may further include a yaw rate detection unit (not shown) to detect the turning degree of the vehicle when the front and rear parts of the vehicle yaw to left and right or are turned, and an acceleration detection unit (a G sensor; not shown) to detect the acceleration and deceleration of the vehicle in the longitudinal direction.

Thereby, the controller 30 may correct the vehicle velocity based on a velocity obtained by integrating the acceleration of the vehicle detected by the acceleration detection unit.

Further, the controller 30 may calculate a correction value of the velocity using the turning degree of the vehicle detected by the yaw rate detection unit and a predetermined vehicle coefficient, correct the vehicle velocity by subtracting the correction value from the vehicle velocity if the vehicle is in the braking state, and correct a reference velocity by adding the correction value to the vehicle velocity if the vehicle is in the acceleration state. Thereby, the velocity of the vehicle may be more precisely estimated.

When the controller 30 restricts regenerative braking force using one of the slip amounts of the respective wheels, i.e., the maximum slip amount, the controller 30 compares the maximum slip amount with a reference slip amount, obtains regenerative braking force corresponding to an exceeding slip amount based on regenerative braking forces according to exceeding slip amounts which have been stored in advance and restricts regenerative braking using the obtained regenerative braking force if the maximum slip amount exceeds the reference slip amount, and restricts regenerative braking using target regenerative braking force if the maximum slip amount is less than the reference slip amount.

That is, the controller 30 stores regenerative braking forces according to exceeding slip amounts in advance.

When the controller 30 restricts regenerative braking force using one of the slip change rates of the respective wheels, i.e., the maximum slip change rate, the controller 30 compares the maximum slip change rate with a reference slip change rate, obtains regenerative braking force corresponding to an exceeding slip change rate based on regenerative braking forces according to exceeding slip change rates which have been stored in advance and restricts regenerative braking using the obtained regenerative braking force if the maximum slip change rate exceeds the reference slip change rate, and restricts regenerative braking using target regenerative braking force if the maximum slip change rate is less than the reference slip change rate.

That is, the controller 30 stores regenerative braking forces according to exceeding slip change rates in advance.

When the controller 30 restricts regenerative braking force using the maximum slip amount and the maximum slip change rate, the controller 30 compares the maximum slip amount with the reference slip amount and compares the maximum slip change rate with the reference slip change rate, obtains regenerative braking force corresponding to an exceeding slip amount and obtains regenerative braking force corresponding to an exceeding slip change rate if the maximum slip amount exceeds the reference slip amount and simultaneously the maximum slip change rate exceeds the reference slip change rate, compares the regenerative braking force corresponding to the slip amount and the regenerative braking force corresponding to the slip change rate, and restricts regenerative braking using the smaller regenerative braking force.

The controller 30 judges whether or not the ABS driving unit 60 or the ESC driving unit 70 is driven during regenerative braking, and stops regenerative braking and controls hydraulic braking if the ABS driving unit 60 or the ESC driving unit 70 is driven.

As described above, by restricting regenerative braking force using at least one of the slip amounts and the slip change rates of the respective wheels, a switch section between regenerative braking and hydraulic braking in a safety function operating area of the ABS or the ESC may be minimized and thus braking stability of the vehicle may be secured.

The regenerative braking unit 40 rotates the motors M provided at the respective wheels in the forward/reverse directions to generate driving force and regenerative braking force of the vehicle, thereby performing driving and regenerative braking of the vehicle.

The regenerative braking unit 40 includes the motors M generating counter electromotive force according to Fleming's rule when the vehicle is driven according to a control signal from the controller 30 and then braked, and batteries (not shown) supplying power to the motors M according to a control signal from the controller 30.

That is, the regenerative braking unit 40 performs energy regeneration and simultaneously generates rolling resistance with rotating force of the motors M corresponding to the control signal from the controller 30, thereby performing regenerative braking.

Here, regenerative braking means braking of the vehicle while the motors M absorb inertial force of the vehicle which tries to go straight during braking of the vehicle, the motors M generate counter electromotive force, and the generated energy is stored in the batteries.

The hydraulic braking unit 50 drives the solenoid valves SV adjusting hydraulic pressure supplied from the master cylinder to the wheel cylinders of the respective wheels according to instructions from the controller 30.

In more detail, the hydraulic braking unit 50 includes the brake pedal pressed or released by a driver and instructing the vehicle to be braked, the booster increasing foot effort on the brake pedal, the master cylinder generating hydraulic pressure by the increase of the foot effort through the booster, a reservoir connected the master cylinder through hydraulic lines and storing a brake fluid, the wheel cylinders installed at the respective wheels and converting hydraulic force supplied from the master cylinder through the hydraulic lines into mechanical force, a hydraulic pump pumping the brake fluid of the reservoir to supply the brake fluid to the respective wheel cylinders, a low-pressure accumulator temporarily storing the brake fluid pumped by the hydraulic pump, and the plural solenoid valves supplying the brake fluid supplied from the master cylinder to the wheel cylinders or returning the braking fluid to the reservoir.

Here, the solenoid valves include normal-opened (NO) type solenoid valves which are respectively disposed between the master cylinder and the wheel cylinders of the wheels and are opened in a normal state, or normal-closed (NC) type solenoid valves which respectively communicate with the hydraulic lines of the wheels connecting the master cylinder and the NO type solenoid valves and are closed in the normal state.

The hydraulic braking unit 50 supplies the brake fluid of the low-pressure accumulator to the wheel cylinders through the NO type solenoid valves by opening the NO type solenoid valves and driving the hydraulic pump according to instructions from the controller 30, when the hydraulic braking force of the wheel cylinders increases, thereby increasing pressure of the wheel cylinders.

The hydraulic braking unit 50 returns the brake fluid of the wheel cylinders to the reservoir R through the NC type solenoid valves by stopping the hydraulic pump and opening the NC type solenoid valves according to instructions from the controller 30, when the hydraulic braking force of the wheel cylinders decreases, thereby decreasing pressure of the wheel cylinders.

The hydraulic braking unit 50 closes the NO type solenoid valves and NC type solenoid valves according to instructions from the controller 30, when proper pressure is applied to the wheel cylinders through pressure decrease and increase, thereby maintaining the pressure of the wheel cylinders.

The anti-lock brake system (ABS) driving unit 60 serves to prevent locking of the brake due to slip on a slippery road and allow the driver to steer the vehicle during braking, and selectively increases or decreases the brake hydraulic pressures of the respective wheels FR, FL, RR and RL according to instructions from the controller 30 so that the slip change rates of the wheels become a designated slip change rate.

The electronic stability control (ESC) driving unit 70 selectively operates the solenoid valves SV of wheels requiring braking from among the front, rear, left and right wheels according to instructions from the controller 30, when slippage of the vehicle occurs in an extremely unstable condition during acceleration, braking or cornering, and thus changes hydraulic boosting force applied to a steering gear in proportion to the velocity of the vehicle, thereby realizing driving stability of the driver at a high velocity and a low velocity and thus stabilizing the pose of the vehicle and correcting a driver's mistake.

Figure 2:
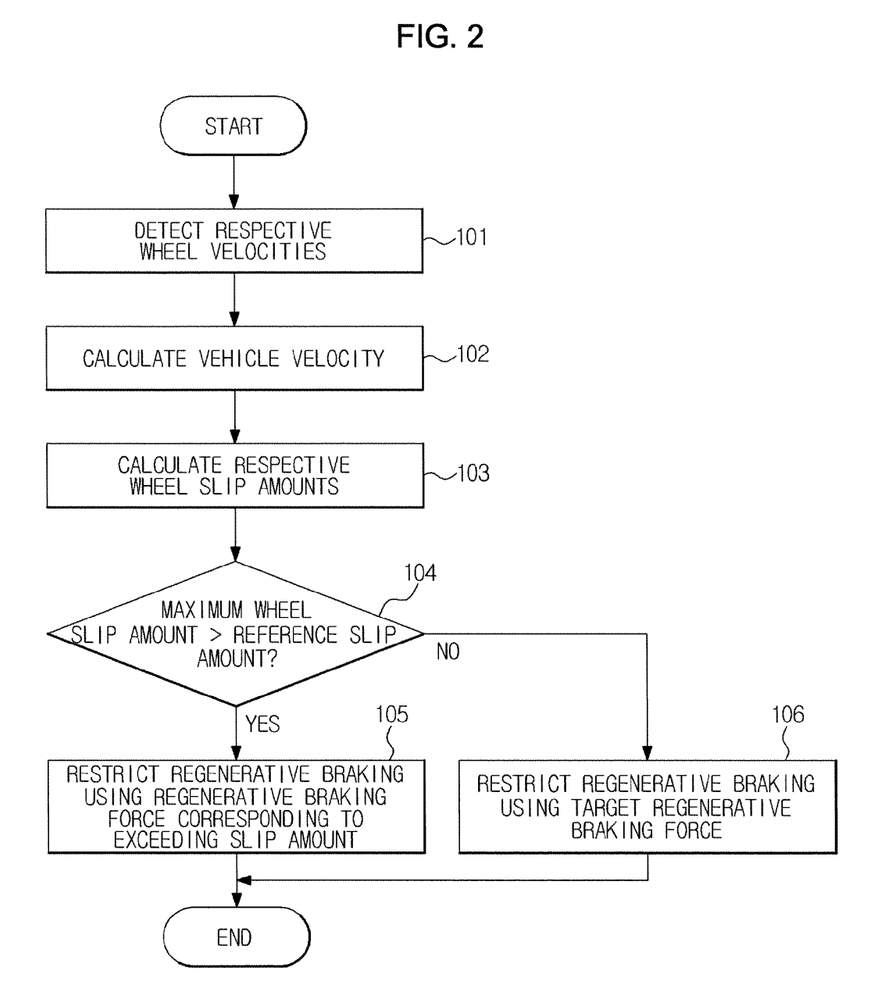
FIG. 2 is a flowchart illustrating a vehicle braking control method in accordance with one embodiment of the present invention.

FIG. 2 is a flowchart illustrating a vehicle braking control method in accordance with one embodiment.

When a driver's braking intention by pressing of the brake pedal by a driver is detected, the vehicle braking system judges required braking force according to the driver's braking intention based on a pedal stroke transmitted from the pedal detection unit 10.

The vehicle braking system calculates target regenerative braking force generated by the motors M while performing regenerative braking during braking of the vehicle. Here, the target regenerative braking force is calculated based on at least one of rotating velocities of the motors M, charging states of the batteries (not shown) and a vehicle state.

Next, the vehicle braking system calculates hydraulic braking force which may match the required braking force based on the calculated target regenerative braking force. That is, the vehicle braking system calculates hydraulic braking force necessary for braking of the vehicle by comparing the required braking force and the target regenerative braking force.

The vehicle braking system detects respective wheel velocities through the wheel velocity detection unit 20 (Operation 101).

Next, the vehicle braking system calculates a vehicle velocity by comparing the velocities of the front left and right wheels and comparing the velocities of the rear left and right wheels based on the velocities of the respective wheels (Operation 102).

Next, the vehicle braking system calculates the slip amounts of the respective wheels by comparing the calculated vehicle velocity and the velocities of the respective wheels (Operation 103), and selects the maximum slip amount from among the slip amounts of the respective wheels.

Next, the vehicle braking system compares the maximum slip amount with a reference slip amount (Operation 104), obtains regenerative braking force corresponding to an exceeding slip amount and restricts regenerative braking using the obtained regenerative braking force if the maximum slip amount exceeds the reference slip amount (Operation 105). Here, regenerative braking forces according to exceeding slip amounts are stored in advance.

On the other hand, the vehicle braking system restricts regenerative braking using the target regenerative braking force if the maximum slip amount is less than the reference slip amount (Operation 106).

The vehicle braking system judges whether or not the ABS driving unit 60 or the ESC driving unit 70 is driven based on slip change rates of the respective wheels during regenerative braking, and stops regenerative braking and controls hydraulic braking upon judging that the ABS driving unit 60 or the ESC driving unit 70 is driven.

Here, the vehicle braking system increases or decreases the pressure of the brake fluid by controlling the brake fluid supplied from the booster to the master cylinder and controlling the solenoid valves SV of the hydraulic braking unit 50, and then supplies the brake fluid to the respective wheel cylinders.

Thereby, the vehicle braking system applies hydraulic braking force to the wheel cylinders of the respective wheels and brakes the vehicle, thus operating the ABS or the ESC.

As described above, a switch section between regenerative braking and hydraulic braking in a safety function operating area of the ABS or the ESC may be minimized by restricting regenerative braking force using the slip amounts of the respective wheels, and thus braking stability of the vehicle may be secured.

Figure 3:
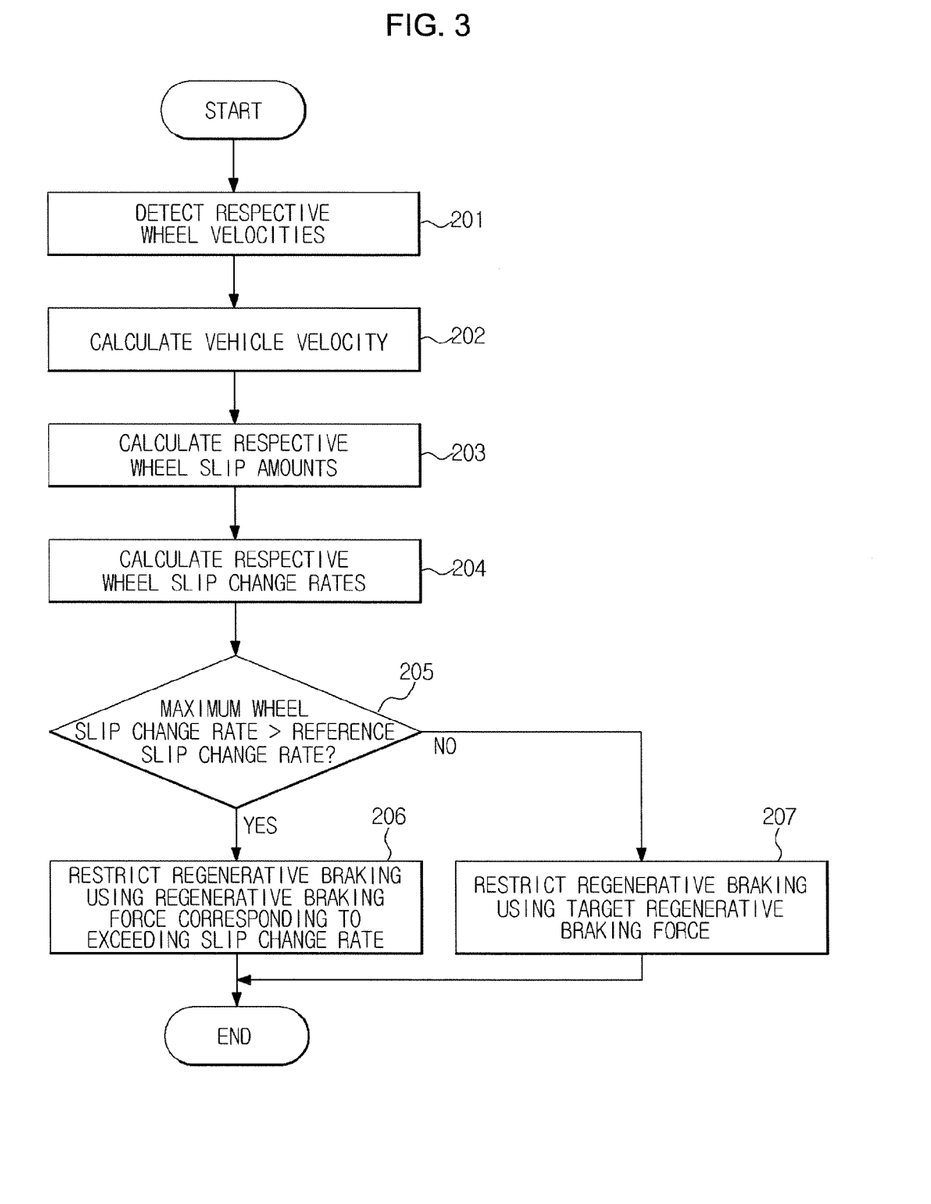
FIG. 3 is a flowchart illustrating a vehicle braking control method in accordance with another embodiment of the present invention.

FIG. 3 is a flowchart illustrating a vehicle braking control method in accordance with another embodiment.

When a driver's braking intention by pressing of the brake pedal by a driver is detected, the vehicle braking system judges required braking force according to the driver's braking intention based on a pedal stroke transmitted from the pedal detection unit 10.

The vehicle braking system calculates target regenerative braking force generated by the motors M while performing regenerative braking during braking of the vehicle. Here, the target regenerative braking force is calculated based on at least one of rotating velocities of the motors M, charging states of the batteries (not shown) and a vehicle state.

Next, the vehicle braking system calculates hydraulic braking force which may match the required braking force based on the calculated target regenerative braking force. That is, the vehicle braking system calculates hydraulic braking force necessary for braking of the vehicle by comparing the required braking force and the target regenerative braking force.

The vehicle braking system detects respective wheel velocities through the wheel velocity detection unit 20 (Operation 201).

Next, the vehicle braking system calculates a vehicle velocity by comparing the velocities of the front left and right wheels and comparing the velocities of the rear left and right wheels based on the velocities of the respective wheels (Operation 202).

Next, the vehicle braking system calculates slip amounts of the respective wheels by comparing the calculated vehicle velocity and the respective wheel velocities (Operation 203), calculates slip amount change rates (I.e., slip change rates) of the respective wheels according to change of time (Operation 204), and selects the maximum slip change rate from among the slip change rates of the respective wheels.

Next, the vehicle braking system compares the maximum slip change rate with a reference slip change rate (Operation 205), obtains regenerative braking force corresponding to an exceeding slip change rate and restricts regenerative braking using the obtained regenerative braking force if the maximum slip change rate exceeds the reference slip change rate (Operation 206). Here, regenerative braking forces according to exceeding slip change rates are set in advance.

On the other hand, the vehicle braking system restricts regenerative braking using the target regenerative braking force if the maximum slip change rate is less than the reference slip change rate (Operation 207).

The vehicle braking system judges whether or not the ABS driving unit 60 or the ESC driving unit 70 is driven based on slip change rates of the respective wheels during regenerative braking, and stops regenerative braking and controls hydraulic braking upon judging that the ABS driving unit 60 or the ESC driving unit 70 is driven.

Here, the vehicle braking system increases or decreases the pressure of the brake fluid by controlling the brake fluid supplied from the booster to the master cylinder and controlling the solenoid valves SV of the hydraulic braking unit 50, and then supplies the brake fluid to the respective wheel cylinders.

Thereby, the vehicle braking system applies hydraulic braking force to the wheel cylinders of the respective wheels and brakes the vehicle, thus operating the ABS or the ESC.

As described above, a switch section between regenerative braking and hydraulic braking in a safety function operating area of the ABS or the ESC may be minimized by restricting regenerative braking force using the slip change rates of the respective wheels, and thus braking stability of the vehicle may be secured.

Figure 4:
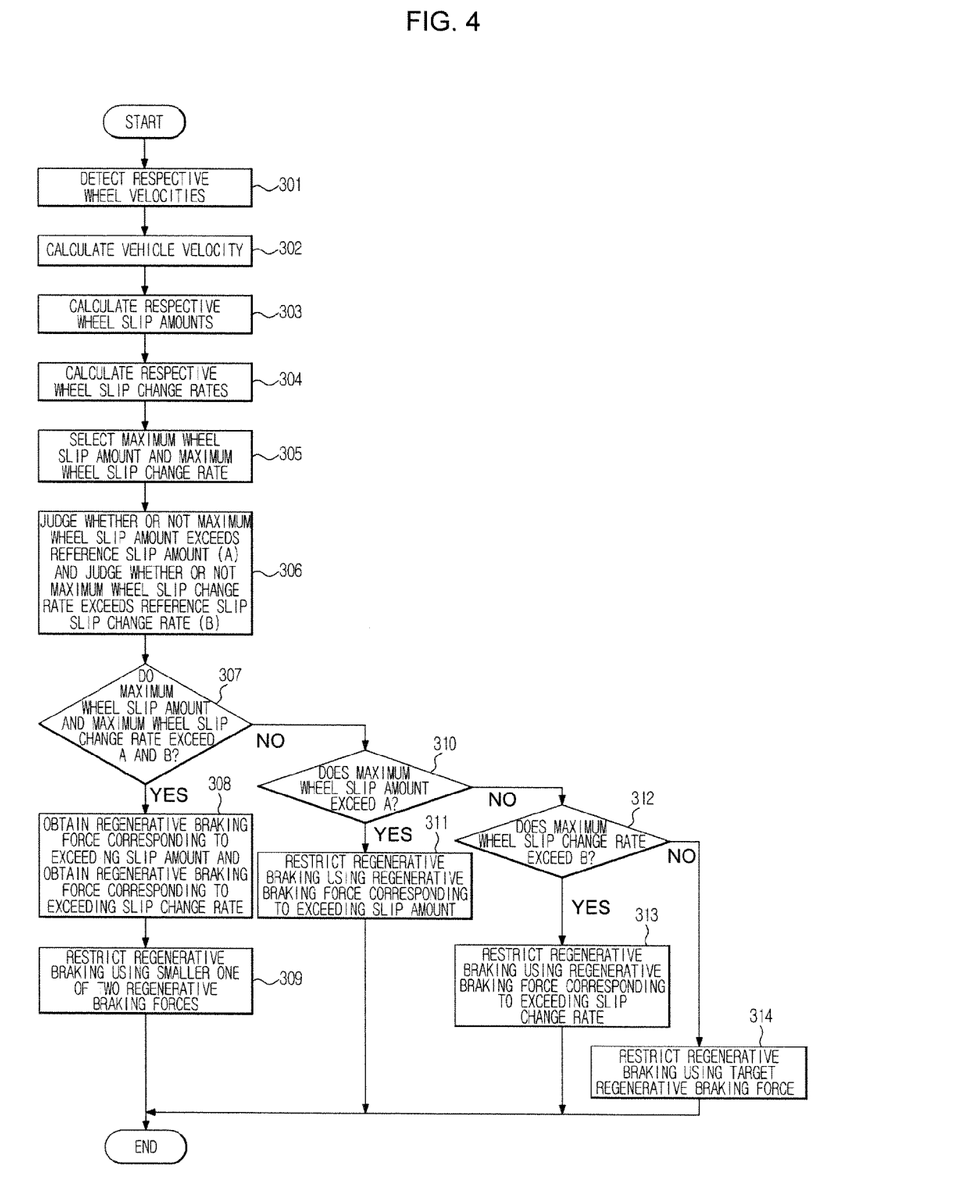
FIG. 4 is a flowchart illustrating a vehicle braking control method in accordance with yet another embodiment of the present invention.

FIG. 4 is a flowchart illustrating a vehicle braking control method in accordance with yet another embodiment.

When a driver's braking intention by pressing of the brake pedal by a driver is detected, the vehicle braking system judges required braking force according to the driver's braking intention based on a pedal stroke transmitted from the pedal detection unit 10.

The vehicle braking system calculates target regenerative braking force generated by the motors M while performing regenerative braking during braking of the vehicle. Here, the target regenerative braking force is calculated based on at least one of rotating velocities of the motors M, charging states of the batteries (not shown) and a vehicle state.

Next, the vehicle braking system calculates hydraulic braking force which may match the required braking force based on the calculated target regenerative braking force. That is, the vehicle braking system calculates hydraulic braking force necessary for braking of the vehicle by comparing the required braking force and the target regenerative braking force.

The vehicle braking system detects respective wheel velocities through the wheel velocity detection unit 20 (Operation 301).

Next, the vehicle braking system calculates a vehicle velocity by comparing the velocities of the front left and right wheels and comparing the velocities of the rear left and right wheels based on the velocities of the respective wheels (Operation 302).

Next, the vehicle braking system calculates slip amounts of the respective wheels by comparing the calculated vehicle velocity and the respective wheel velocities (Operation 303), and calculates slip amount change rates (I.e., slip change rates) of the respective wheels according to change of time (Operation 304).

Next, the vehicle braking system selects the maximum slip amount from among the slip amounts of the respective wheels, and selects the maximum slip change rates from among the slip change rates of the respective wheels (Operation 305).

Next, the vehicle braking system compares the maximum slip amount with a reference slip amount, and compares the maximum slip change rate with a reference slip change rate.

Next, the vehicle braking system judges whether or not the maximum slip amount exceeds the reference slip amount (A) and judges whether or not the maximum slip change rate exceeds the reference slip change rate (B), simultaneously (Operation 306).

Next, the vehicle braking system judges whether or not the maximum slip amount exceeds the reference slip amount (A) and judges whether or not the maximum slip change rate exceeds the reference slip change rate (B), simultaneously (Operation 307).

Here, the vehicle braking system obtains regenerative braking force corresponding to an exceeding slip amount and obtains regenerative braking force corresponding to an exceeding slip change rate if the maximum slip amount exceeds the reference slip amount and the maximum slip change rate exceeds the reference slip change rate, simultaneously (Operation 308).

Here, regenerative braking forces according to exceeding slip amounts and regenerative braking forces according to exceeding slip change rates are set in advance.

Next, the vehicle braking system compares the regenerative braking force corresponding to the slip amount and the regenerative braking force corresponding to the slip change rate, and restricts regenerative braking using the smaller regenerative braking force from among the two regenerative braking forces (Operation 309).

If only one of the maximum slip amount and the maximum slip change rate exceeds the corresponding reference value (the reference slip amount or the reference slip change rate), regenerative braking is restricted using the regenerative braking force corresponding to the exceeding value.

In more detail, the vehicle braking system judges whether or not the maximum wheel slip amount exceeds the reference slip amount (Operation 310). That is, if the maximum slip amount exceeds the reference slip amount and the maximum slip change rate is less than the reference slip change rate, the vehicle braking system restricts regenerative braking using the regenerative braking force corresponding to the exceeding maximum slip amount (Operation 311).

Next, the vehicle braking system judges whether or not the maximum wheel slip change rate exceeds the reference slip change rate (Operation 312). That is, if the maximum slip amount is less than the reference slip amount and the maximum slip change rate exceeds the reference slip change rate, the vehicle braking system restricts regenerative braking using the regenerative braking force corresponding to the exceeding maximum slip change rate (Operation 313).

If the maximum slip amount is less than the reference slip amount and the maximum slip change rate is less than the reference slip change rate, the vehicle braking system restricts regenerative braking using the target regenerative braking force (Operation 314).

The vehicle braking system judges whether or not the ABS driving unit 60 or the ESC driving unit 70 is driven based on the slip change rates of the respective wheels during regenerative braking, and stops regenerating braking and controls hydraulic braking upon judging that the ABS driving unit 60 or the ESC driving unit 70 is driven.

The vehicle braking system increases or decreases the pressure of the brake fluid by controlling the brake fluid supplied from the booster to the master cylinder and controlling the solenoid valves SV of the hydraulic braking unit 50, and then supplies the brake fluid to the respective wheel cylinders. Thereby, the vehicle braking system applies hydraulic braking force to the wheel cylinders of the respective wheels and brakes the vehicle, thus operating the ABS or the ESC.

As described above, a switch section between regenerative braking and hydraulic braking in a safety function operating area of the ABS or the ESC may be minimized by restricting regenerative braking force using the slip amounts and the slip change rates of the respective wheels, and thus braking stability of the vehicle may be secured.

As is apparent from the above description, a vehicle braking system and control method in accordance with one embodiment restricts regenerative braking force using at least one of slip amounts and slip change rates of respective wheels and then operates a safety function, such as the ABS or the ESC, thereby minimizing a switch section between regenerative braking and hydraulic braking in an operation area of a safety function, such as the ABS or the ESC, thus securing braking stability of a vehicle.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A vehicle braking system comprising:
a wheel velocity detection unit detecting velocities of respective wheels provided at a vehicle; and
a controller calculating a vehicle velocity based on the velocities of the respective wheels of the vehicle, calculating slip amounts of the respective wheels by comparing the vehicle velocity and the velocities of the respective wheels, selecting one slip amount from among the slip amounts of the respective wheels, comparing the selected slip amount with a reference slip amount, obtaining regenerative braking force corresponding to an exceeding slip amount if the selected slip amount exceeds the reference slip amount, and controlling regenerative braking using the obtained regenerative braking force,
wherein the controller calculates change rates of the slip amounts of the respective wheels, selects one slip change rate from among the slip change rates of the respective wheels, compares the selected slip change rate with a reference slip change rate, obtains regenerative braking force corresponding to an exceeding slip change rate if the selected slip change rate exceeds the reference slip change rate, and controls regenerative braking using the obtained regenerative braking force, and
wherein the controller compares the regenerative braking force corresponding to the exceeding slip amount and the regenerative braking force corresponding to the exceeding slip change rate if the selected slip amount exceeds the reference slip amount and the selected slip change rate exceeds the reference slip change rate, simultaneously, and controls regenerative braking using the smaller regenerative braking force of the two regenerative braking forces.

2. The vehicle braking system according to claim 1, wherein the controller stops the regenerative braking and controls hydraulic braking when a safety function is performed during the control of the regenerative braking.

3. The vehicle braking system according to claim 1, wherein regenerative braking forces according to exceeding slip amounts are stored in advance in the controller.

4. The vehicle braking system according to claim 1, wherein regenerative braking forces according to exceeding slip change rates are stored in advance in the controller.

5. A vehicle braking control method comprising:
detecting, via a wheel velocity detection unit, velocities of respective wheels provided at a vehicle;
calculating, via a controller, a vehicle velocity based on the velocities of the respective wheels;
calculating, via the controller, slip amounts of the respective wheels by comparing the vehicle velocity and the velocities of the respective wheels;
calculating, via the controller, change rates of the slip amounts of the respective wheels;
obtaining, via the controller, a regenerative braking force corresponding to one of the slip amounts and one of the slip change rates of the respective wheels; and
controlling, via the controller, regenerative braking using the obtained regenerative braking force, wherein the obtainment of the regenerative braking force includes:

selecting one slip amount from among the slip amounts of the respective wheels and comparing the selected slip amount with a reference slip amount;

calculating change rates of the slip amounts of the respective wheels, selecting one slip change rate from among the slip change rates of the respective wheels and comparing the selected slip change rate with a reference slip change rate;

obtaining regenerative braking force corresponding to an exceeding slip amount and regenerative braking force corresponding to an exceeding slip change rate if the selected slip amount exceeds the reference slip amount and the selected slip change rate exceeds the reference slip change rate, simultaneously; and obtaining the smaller regenerative braking force of the two regenerative braking forces by comparing the two obtained regenerative braking forces.

6. The vehicle braking control method according to claim 5, wherein the obtainment of the regenerative braking force further includes:

obtaining regenerative braking force corresponding to the exceeding slip amount if the selected slip amount exceeds the reference slip amount and the selected slip change rate is less than the reference slip change rate;

obtaining regenerative braking force corresponding to the exceeding slip change rate if the selected slip amount is less than the reference slip amount and the selected slip change rate exceeds the reference slip change rate; and obtaining target regenerative braking force corresponding to a driver's braking requirement if the selected slip amount is less than the reference slip amount and the selected slip change rate is less than the reference slip change rate, simultaneously.

7. The vehicle braking control method according to claim 5, wherein:

the selection of one slip amount from among the slip amounts of the respective wheels includes selecting the maximum slip amount; and the selection of one slip change rate from among the slip change rates of the respective wheels includes selecting the maximum slip change rate.

8. The vehicle braking control method according to claim 5, wherein the obtainment of the regenerative braking force includes:

storing regenerative braking forces according to exceeding slip amounts and regenerative braking forces according to exceeding slip change rates in advance;

obtaining regenerative braking force corresponding to the exceeding slip amount from among the regenerative braking forces according to exceeding slip amounts; and obtaining regenerative braking force corresponding to the exceeding slip change rate from among the regenerative braking forces according to exceeding slip change rates.

* * * * *